US010821887B1

(12) United States Patent
Kemler et al.

(10) Patent No.: US 10,821,887 B1
(45) Date of Patent: *Nov. 3, 2020

(54) UNIQUE SIGNALING FOR VEHICLES TO PRESERVE USER PRIVACY

(71) Applicant: Waymo LLC, Mountain View, CA (US)

(72) Inventors: Brian Kemler, San Francisco, CA (US); Daniel Fredinburg, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,784

(22) Filed: Jul. 8, 2019

Related U.S. Application Data

(63) Continuation of application No. 15/633,073, filed on Jun. 26, 2017, now Pat. No. 10,384,597, which is a
(Continued)

(51) Int. Cl.
*B60Q 1/50* (2006.01)
*G08G 1/00* (2006.01)
(Continued)

(52) U.S. Cl.
CPC ............... *B60Q 1/503* (2013.01); *B60Q 1/50* (2013.01); *G01C 21/3415* (2013.01);
(Continued)

(58) Field of Classification Search
CPC .......... B60Q 1/503; B60Q 1/50; G08G 1/202; G01C 21/3415; G01C 21/3438; G05D 1/0223
See application file for complete search history.

(56) References Cited

U.S. PATENT DOCUMENTS 4,876,812 A 10/1989 Haralson
6,356,838 B1 3/2002 Paul
(Continued)

OTHER PUBLICATIONS

"International Search Report and Written Opinion received for PCT Patent Application No. PCT/US2018/031780, dated Jul. 16, 2018", 15 pages.
(Continued)

*Primary Examiner* — Michael J Zanelli
(74) *Attorney, Agent, or Firm* — Botos Churchill IP Law

(57) ABSTRACT

Aspects of the present disclosure relate to protecting the privacy of a user of a dispatching service for driverless vehicles. For example, a request for a vehicle identifying user information is received. A client computing device may be identified based on the user information. In response to the request, a driverless vehicle may be dispatched to the location of the client device. Signaling information may be generated based on a set of rules including a first rule that the signaling information does not identify, indirectly or directly, the user as well as a second rule that the signaling information does not identify, indirectly or directly, the user information. The location of the client computing device and the signaling information may be sent to the driverless vehicle for display. In addition, the signaling information may also be sent to the client computing device for display.

20 Claims, 10 Drawing Sheets

Related U.S. Application Data continuation of application No. 15/084,568, filed on Mar. 30, 2016, now Pat. No. 10,272,827, which is a continuation of application No. 14/244,404, filed on Apr. 3, 2014, now Pat. No. 9,494,938.

(51) Int. Cl.
 *G01C 21/34* (2006.01)
 *G05D 1/02* (2020.01)

(52) U.S. Cl.
 CPC ....... *G01C 21/3438* (2013.01); *G05D 1/0223* (2013.01); *G08G 1/202* (2013.01)

(56) References Cited

U.S. PATENT DOCUMENTS

| | | |
|---|---|---|
| 6,414,635 B1 | 7/2002 | Stewart et al. |
| 6,545,601 B1 | 4/2003 | Monroe |
| 6,812,851 B1 | 11/2004 | Dukach et al. |
| 7,920,071 B2 | 4/2011 | Baillot |
| 8,346,426 B1 | 1/2013 | Szybalski et al. |
| 9,020,533 B1 | 4/2015 | Mangiardi et al. |
| 9,343,002 B2 | 5/2016 | Hagemann et al. |
| 9,429,947 B1 | 8/2016 | Wengreen |
| 9,436,180 B1 | 9/2016 | Fredinburg et al. |
| 9,547,307 B1 | 1/2017 | Cullinane et al. |
| 9,551,992 B1 | 1/2017 | Barton-Sweeney et al. |
| 9,733,096 B2 | 8/2017 | Colijn et al. |
| 10,384,597 B1 | 8/2019 | Kemler et al. |
| 2002/0028002 A1 | 3/2002 | Whited |
| 2002/0038181 A1 | 3/2002 | Okude et al. |
| 2002/0058517 A1 | 5/2002 | Furukawa et al. |
| 2002/0075201 A1 | 6/2002 | Sauer et al. |
| 2002/0183920 A1 | 12/2002 | Smith et al. |
| 2003/0125845 A1 | 7/2003 | Carlstedt et al. |
| 2003/0222794 A1 | 12/2003 | Vial |
| 2004/0076280 A1 | 4/2004 | Ando et al. |
| 2004/0102898 A1 | 5/2004 | Yokota et al. |
| 2004/0128065 A1 | 7/2004 | Taylor et al. |
| 2005/0018066 A1 | 1/2005 | Hofer |
| 2005/0104745 A1 | 5/2005 | Bachelder et al. |
| 2005/0114014 A1 | 5/2005 | Issac |
| 2005/0153707 A1 | 7/2005 | Ledyard et al. |
| 2005/0225636 A1 | 10/2005 | Maemura et al. |
| 2005/0231419 A1 | 10/2005 | Mitchell |
| 2007/0197231 A1 | 8/2007 | Lin |
| 2007/0279521 A1 | 12/2007 | Cohen |
| 2008/0270204 A1 | 10/2008 | Poykko et al. |
| 2008/0275645 A1 | 11/2008 | Hoshino |
| 2009/0156241 A1 | 6/2009 | Staffaroni et al. |
| 2009/0192851 A1 | 7/2009 | Bishop |
| 2009/0234573 A1 | 9/2009 | Notarantonio |
| 2009/0326991 A1 | 12/2009 | Wei et al. |
| 2010/0194596 A1 | 8/2010 | Wang et al. |
| 2010/0228574 A1 | 9/2010 | Mundinger et al. |
| 2010/0241349 A1 | 9/2010 | Wu |
| 2010/0265048 A1 | 10/2010 | Lu et al. |
| 2010/0293030 A1 | 11/2010 | Wu |
| 2010/0332133 A1 | 12/2010 | Harris et al. |
| 2011/0050463 A1 | 3/2011 | Yu et al. |
| 2011/0053642 A1 | 3/2011 | Lee |
| 2011/0059693 A1* | 3/2011 | O'Sullivan ............ G06Q 10/00 455/41.1 |
| 2011/0068954 A1 | 3/2011 | Mcquade et al. |
| 2011/0099040 A1 | 4/2011 | Felt et al. |
| 2011/0216200 A1 | 9/2011 | Chung et al. |
| 2011/0313594 A1 | 12/2011 | Kato et al. |
| 2011/0313880 A1 | 12/2011 | Paul et al. |
| 2012/0041675 A1 | 2/2012 | Juliver et al. |
| 2012/0109694 A1 | 5/2012 | Lee et al. |
| 2012/0130627 A1 | 5/2012 | Islam |
| 2012/0154591 A1 | 6/2012 | Baur et al. |
| 2012/0191269 A1 | 7/2012 | Chen et al. |
| 2012/0277952 A1 | 11/2012 | MacNeille |
| 2013/0046456 A1 | 2/2013 | Scofield et al. |
| 2013/0074383 A1 | 3/2013 | Hagemann et al. |
| 2013/0144660 A1 | 6/2013 | Martin |
| 2013/0149998 A1 | 6/2013 | Yi et al. |
| 2013/0204463 A1 | 8/2013 | Chiappetta |
| 2013/0211916 A1 | 8/2013 | Putman |
| 2013/0218647 A1 | 8/2013 | Kroll et al. |
| 2013/0286206 A1 | 10/2013 | Ozaki et al. |
| 2013/0289858 A1 | 10/2013 | Mangiat et al. |
| 2014/0051465 A1 | 2/2014 | Ruys et al. |
| 2014/0172727 A1 | 6/2014 | Abhyanker et al. |
| 2014/0200739 A1 | 7/2014 | Kirsch |
| 2014/0300449 A1* | 10/2014 | Kounavis ................. G08B 7/06 340/6.1 |
| 2014/0365250 A1 | 12/2014 | Ikeda et al. |
| 2015/0032328 A1 | 1/2015 | Healey et al. |
| 2015/0081362 A1 | 3/2015 | Chadwick et al. |
| 2015/0142484 A1 | 5/2015 | Huang et al. |
| 2015/0154810 A1 | 6/2015 | Tew et al. |
| 2015/0161554 A1 | 6/2015 | Sweeney et al. |
| 2015/0175072 A1 | 6/2015 | Sabeti |
| 2015/0199619 A1 | 7/2015 | Ichinose et al. |
| 2015/0220791 A1 | 8/2015 | Wu et al. |
| 2015/0302342 A1 | 10/2015 | Yeh |
| 2015/0338849 A1 | 11/2015 | Nemec et al. |
| 2015/0339923 A1 | 11/2015 | König et al. |
| 2015/0346727 A1 | 12/2015 | Madhusoodhan |
| 2016/0021154 A1 | 1/2016 | Schoeffler |
| 2016/0161266 A1 | 6/2016 | Crawford et al. |
| 2017/0153714 A1 | 6/2017 | Gao et al. |
| 2017/0286884 A1 | 10/2017 | Shoval et al. |

OTHER PUBLICATIONS

Bose, et al., "Autonomously Controlled Storage Management in Vehicle Logistics—Applications of RFID and Mobile Computing Systems", International Journal of RF Technologies: Research and Applications, iFirst Article, 2008, pp. 1-20.

Brownell, Christopher Kirlin, "Shared Autonomous Taxi Networks: An Analysis of Transportation Demand in NJ and a 21st Century Soluion for Congestion", Submitted in partial fulfillment of the requirements for the degree of Bachelor of Science and Engineering, Princeton University, Apr. 15, 2013, 122 pages.

* cited by examiner

UNIQUE SIGNALING FOR VEHICLES TO PRESERVE USER PRIVACY

CROSS-REFERENCE TO RELATED APPLICATIONS

The present application is a continuation of U.S. patent application Ser. No. 15/633,073, filed Jun. 26, 2017, which is a continuation of U.S. patent application Ser. No. 15/084,568, filed Mar. 30, 2016, now issued as U.S. Pat. No. 10,272,827, which is a continuation of U.S. patent application Ser. No. 14/244,404, filed Apr. 3, 2014, now issued as U.S. Pat. No. 9,494,938, the disclosures of which are incorporated herein by reference.

BACKGROUND

Autonomous vehicles, such as vehicles which do not require a human driver, can be used to aid in the transport of passengers or items from one location to another. With a typical taxi or car service, a human driver can interact with a passenger to identify himself to that passenger. However, when an autonomous vehicle attempts to pick up a passenger or drop off a delivery, it can be difficult for the user being picked up or retrieving the item to know which autonomous vehicle is assigned to them. This can be exacerbated if there are numerous vehicles being sent to the same location to pick up multiple passengers or items. A passenger may not know how to confirm which vehicle belongs to, or was dispatched to, him or her. As an example, this can also lead to passengers interacting with vehicles which were not assigned to them.

BRIEF SUMMARY

One aspect of the disclosure provides a method. The method includes receiving, by one or more computing devices, a request for a vehicle. This request identifies user information. The method also includes identifying, by the one or more computing devices, a client computing device based on the user information. The one or more computing devices also identify a location of the client computing device. In response to the request the one or more computing devices dispatch a driverless vehicle to the location of the client device. The one or more computing devices generate signaling information based on a set of rules. The set of rules includes first rule that the signaling information does not identify, indirectly or directly, a user and a second rule that the signaling information does not identify, indirectly or directly, the user information. The one or more computing devices send the location of the client computing device and the signaling information to the driverless vehicle for display to the user, and the signaling information to the client computing device for display to the user.

In one example, the request further includes a destination location and the set of rules further includes a third rule that the signaling information does not identify, directly or indirectly, the destination location. In this example, the method also includes providing the driverless vehicle with the destination location. In another example, the set of rules further includes a third rule that the signaling information is unique to the user. In another example, the set of rules further includes a third rule that the signaling information cannot already have been generated for the user previously. In another example, the method also includes using the user information to identify user account information including identifying information of the user, and the set of rules further includes a third rule that the signaling information cannot, directly or indirectly, identify the user account information. In another example, a notification is received by the one or more computing devices from the driverless vehicle that the driverless vehicle has reached a threshold distance or time from the location of the client computing device, and the signaling information is sent to the driverless vehicle only after the notification is received. In this example, the signaling information is sent to the client computing device only after the notification is received. In another example, the set of rules includes a third rule that requires that the unique signal is to expire a specific amount of time after the driverless vehicle is expected to reach the location of the client computing device. In another example, the request is received from a particular client computing device other than the client computing device. In this example, the method also includes sending a request to the client computing device for the location of the client computing device, and identifying the location of the client computing device includes receiving the location of the client computing device in response to the request.

Another aspect of the disclosure provides a system. The system includes an electronic display positioned external to a vehicle and one or more computing devices. The one or more computing devices are configured to receive, from one or more server computing devices, a message with dispatch instructions including a location; maneuver the vehicle to the location; receive, from the one or more server computing devices, signaling information; determine when the vehicle reaches a particular location that is a threshold distance from the location; and after the vehicle reaches the particular location, display the signaling information on the electronic display to identify the vehicle to a user.

In one example, the system also includes the vehicle, and the one or more computing devices are incorporated into the vehicle. In another example, the one or more computing devices are also configured to, when the vehicle reaches the particular location, send a notification to the one or more server computing devices and the signaling information is received in response to the request. In another example, the one or more computing devices are further configured to determine a route to the location, and the threshold distance is a distance in time along the route. In another example, the one or more computing devices are further configured to determine a route to the location, and the threshold distance is a physical distance along the route. In another example, the one or more computing devices are also configured to periodically receive an updated location and use the updated location to update the location such that the particular location is also updated. In another example, the one or more computing devices are also configured to periodically receive an updated location and use the updated location to update the location such that the vehicle is maneuvered to the updated location. In another example, the system also includes the one or more server computing devices. In this example, the one or more server computing devices are configured to receive a request for a vehicle identifying the location and user information; in response to the request, send the message to the one or more computing devices; generate the signaling information based on a set of rules including a first rule that the signaling information does not identify, indirectly or directly, a user and a second rule that the signaling information does not identify, indirectly or directly, the user information; and send the signaling information to the one or more computing devices. In this example, the set of rules also includes a third rule that the signaling information cannot already have been generated for any user previously.

A further aspect of the disclosure provides a non-transitory computer-readable storage medium on which computer readable instructions of a program are stored. The instructions, when executed by one or more processors, cause the one or more processors to perform a method. The method includes, in response to the request, dispatching a driverless vehicle to the location of the client device; generating signaling information based on a set of rules, the set of rules including a first rule that the signaling information does not identify, indirectly or directly, a user and a second rule that the signaling information does not identify, indirectly or directly, the user information; sending the location of the client computing device and the signaling information to the driverless vehicle for display to the user; and sending the signaling information to the client computing device for display to the user.

DETAILED DESCRIPTION

The technology relates to providing a user with a way to identify or verify a vehicle dispatched to pick up a user or drop off a delivery to the user. For examples the vehicle may be a driverless (autonomous) vehicle, such that a driver would not be available to help the user identify the correct vehicle. In this regard, once the vehicle is within a certain distance of the user, the vehicle may signal to the user in order to identify the vehicle to the user and avoid confusion. This signaling could include a display or audio including a unique string of text.

As noted above, the technology may be applicable in various circumstances. In one instance, a user may use a client device, such as a mobile phone or wearable computing device or system (e.g., head-mounted, wrist, clip-on, etc.), to request a vehicle. The request may be sent to a centralized dispatching system which selects or assigns a vehicle to the requesting user. At the same time, the centralized dispatching system may generate a signal to identify the vehicle to the user. In another instance, the centralized dispatching system may assign a vehicle to a particular user in order to make a delivery. Again, the centralized system may generate a signal to identify the vehicle to the user.

The signal may include a unique, distinct, and/or easily distinguishable string of text or image rather than the user's name, destination, etc. This protects the user's privacy. The signal may also be selected by the user, for example, when setting up an account to use the dispatching service. In some examples, if the user is to be a passenger of the vehicle, the unique string may be an authentication token which expires after some event.

As the vehicle approaches the user's client device, the vehicle's computing device may receive from the centralized dispatching system location information generated by the user's client device. The vehicle's computing device may use this information to maneuver the vehicle to the user's client device as well as to determine a distance or time to reach the user's client device. Once the vehicle is within a certain distance of the user's client device, the vehicle's computing device may display the signal on an external display of the vehicle such that the signal should be visible to the user as the vehicle approaches the user's client device.

For confirmation, the signal may also be provided to the user's client device. As an example, the centralized dispatching system may send the signal when the vehicle is dispatched or when the vehicle is within the certain distance or time relative to the user. Thus, rather than simply getting a notification that the user's vehicle is "here," the user also receives information which may be used to identify the vehicle to the user without compromising the user's privacy.

Figure 1:
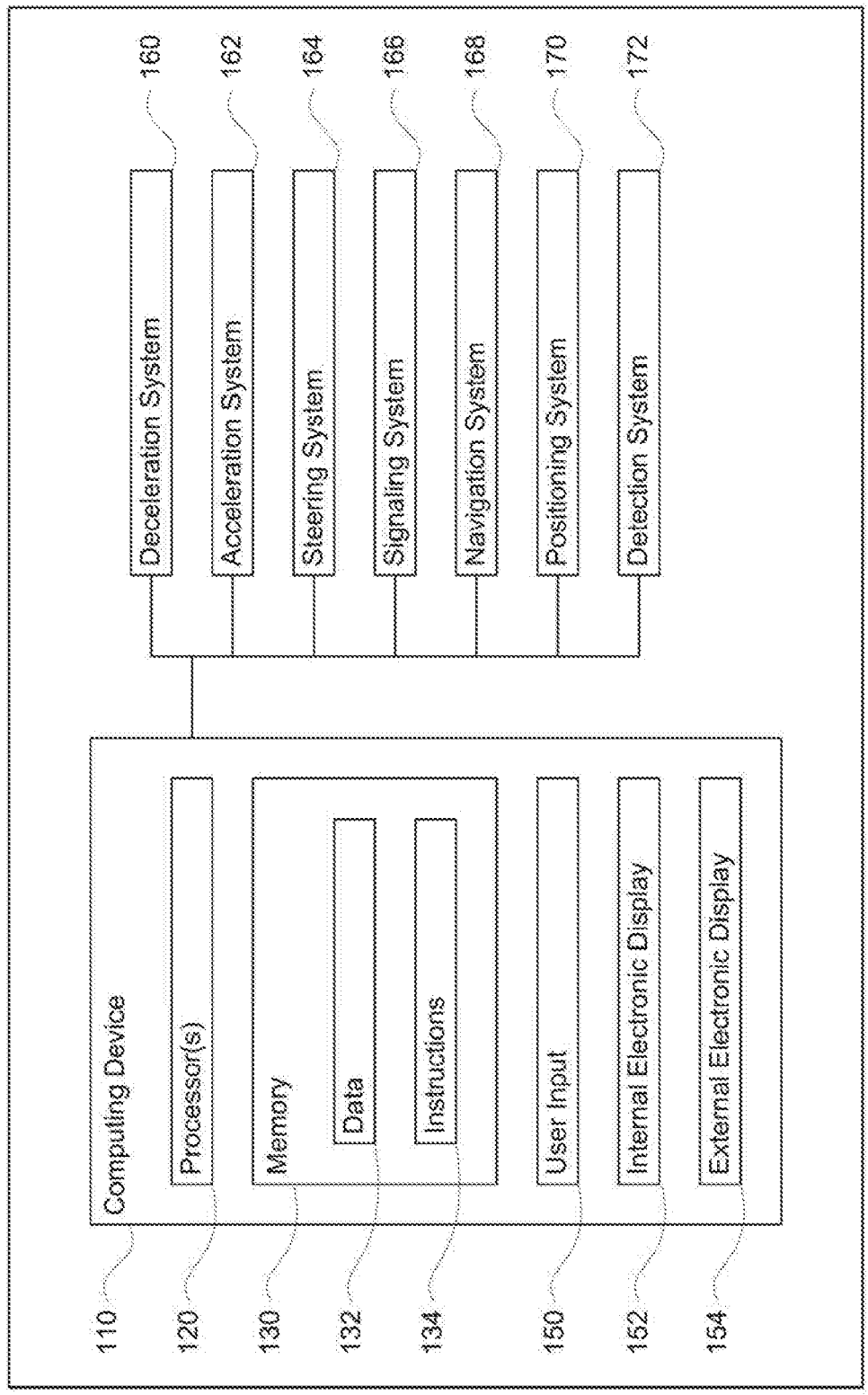
FIG. 1 is a functional diagram of an example vehicle in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152 as well as an external electronic display 154. In this regard, internal electronic display 152 may be located within a cabin of vehicle 100 and may be used by computing device 110 to provide information to passengers within the vehicle 100. External electronic display 154 may be located eternally or mounted on an external surface of the vehicle 100 and may be used by computing device 110 to provide information to potential passengers or other persons outside of vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 170 may include lasers, sonar, radar, cameras or any other detection devices which record data which may be processed by computing device 110. In the case where the vehicle is a small passenger vehicle such as a car, the car may include a laser mounted on the roof or other convenient location.

The computing device 110 may control the direction and speed of the vehicle by controlling various components. By way of example, if the vehicle is operating completely autonomously, computing device 110 may navigate the vehicle to a location using data from the detailed map information and navigation system 168. Computer 110 may use the positioning system 170 to determine the vehicle's location and detection system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Computing device 110 of vehicle 100 may also receive or transfer information to and from other computing devices.

Figure 2:
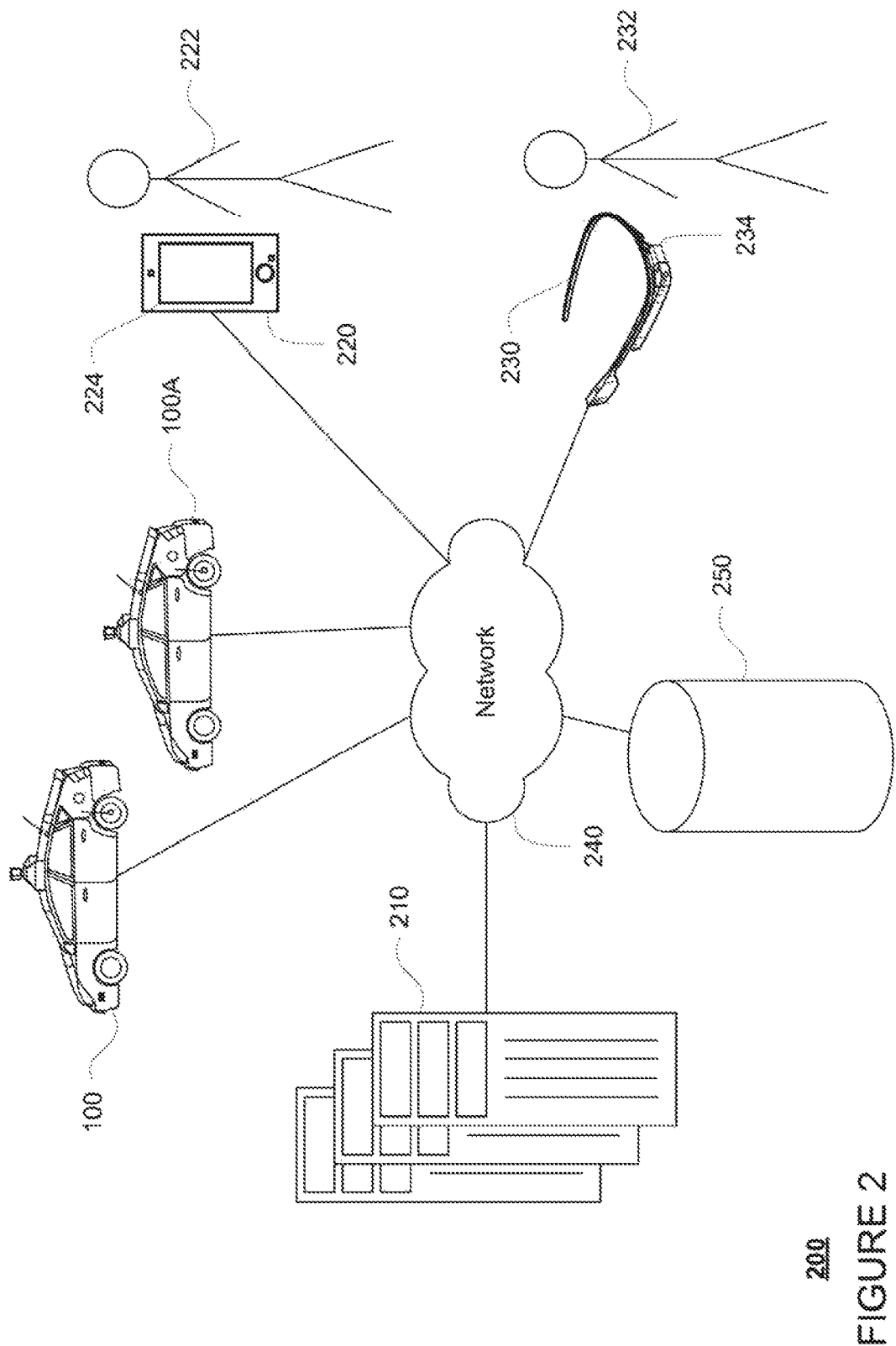
FIG. 2 is a functional diagram of an example system in accordance with an exemplary embodiment.
Figure 3:
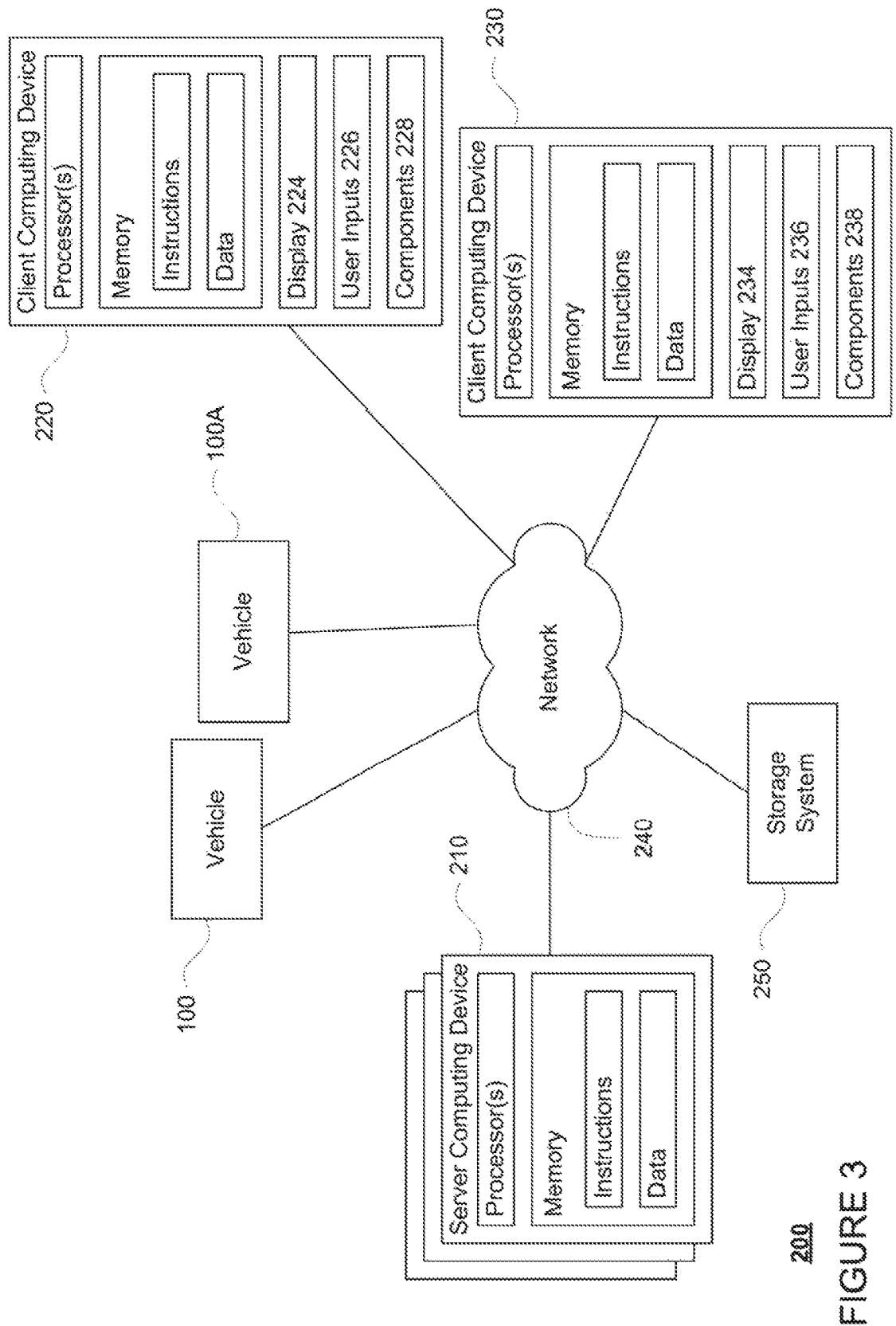
FIG. 3 is a pictorial diagram of the system of FIG. 2 in accordance with aspects of the disclosure.

FIGS. 2 and 3 are pictorial and functional diagrams, respectively, of an example system 200 that includes a plurality of computing devices 210, 220, and 230 and a storage system 250 connected via a network 240. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, and 230 may include one or more processors, memory, data and instructions. Such processors, memories, data and instructions may be configured similarly to one or more processors 120, memory 130, data 134, and instructions 132 of computing device 110.

The network 240, and intervening nodes, may include various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220 and 230 via the network 240. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 240 to transmit and present information to a user, such as user 222, or 232, on a display, such as displays 224 or 234 of computing devices 220 or 230. In this regard, computing devices 220 and 230 may be considered client computing devices.

As shown in FIG. 3, each client computing device 220 or 230 may be a personal computing device intended for use by a user 222 or 232, and have all of the components normally used in connection with a personal computing device including a one or more processors (e.g., a central processing unit (CPU)), memory (e.g., RAM and internal hard drives) storing data and instructions, a display such as displays 224 and 234 (e.g., a monitor having a screen, a touch-screen, a projector, a television, or other device that is operable to display information), and user input devices 226 and 236 (e.g., a mouse, keyboard, touch-screen or microphone). The client computing devices may also include a camera for recording video streams, speakers, a network interface device, and all of the components used for connecting these elements to one another. In addition, the client computing devices may also include components 228 and 238 for determining the position and orientation of client computing devices 220 and 230. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220 and 230 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet. In another example, client computing device 230 may be a wearable computing system, shown as a head-mounted computing system in FIG. 2. As an example the user may input information using a small keyboard, a keypad, microphone, using visual signals with a camera, or a touch screen.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store a set of rules for generating the unique signals. As an example, one rule may require that the unique signal generated for a given user cannot identify, directly or indirectly, the user by name or any of the user's other account information such as the user's contact information or identifying information of the user's client computing device (or devices)). For example, if the user's name is "Robert," such as rule would require that unique signal cannot include "robert", as an example of a direct reference to the user's name. Similarly, as an example of an indirect reference to the user's name, variations or portions of the name "robert" such as "bob", "bobby", "bert", "obe", etc. as well as cyphers, codes or information generated using for "Robert" or any variation or portion of "Robert."

Another rule may require that the unique signal cannot identify, directly or indirectly, a prior or current location of the user or rather, the user's client computing device. And, if the user is to be transported to a particular destination location, the rules may require that the unique signal cannot identify, directly or indirectly, that particular destination location. For instance, a location may be identified directly by an address, geographic coordinates, a name of a point of interest, etc. A location may be identified indirectly, by reference to an image of the location, an image of an object at or near that location, an image of an activity at that location, by reference to another location proximate to the location, a general description of the location (the building next to Bob's house), or any other cypher or code that could be used to identify the location.

A further rule may also require that the signal actually be unique. For example, this may mean that it cannot already have been generated for another user or for the given user previously. As another example rule, the unique signal cannot be used for another user within a certain geographical area (e.g. the same city, state, within 50 miles, etc.), for instance the same unique signal cannot be used for two users within the same state. In another example rule, the same unique signal cannot be used again within a certain period of time (e.g. a day, a month, a year, etc.) Similarly, combination of these time and geographic rules may also be used. For instance, the same unique signal may not be used for users in the same state unless there is at least 1 month between uses. In this regard, if these geographical area and/or time rules would not apply, then a unique signal may be reused or recycled for another user or even the same user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (north, south, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 240 as shown in FIG. 2 and/or may be directly connected to or incorporated into any of the computing devices 110, 210, 220, 230, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application to client computing devices 220 and 230. The client computing device may then transmit a request for the application over the network, for example, to one or more server computing devices 210, and in response, receive the application. The application may be installed locally at the client computing device.

As part of an initial set up of the application, the user may be assigned or provide credentials for using the application. For example, a user may select a username and password. In some instances, a user may select, identify, or be asked to confirm a unique signal to represent the user. The unique signal may be generated by the one or more server computing devices 210 as described in more detail below. This information may be sent to one or more server computing devices 210 and stored as part of the user account information of storage system 150. In addition, the user may grant the application permission to send the location of the user's client computing device as needed in order to provide vehicle dispatching services to the user.

Once the application is installed and setup, the user may request a vehicle. As an example, a user such as user 232 may use client computing device 230 to send a request to one or more server computing devices 210 for a vehicle to deliver an item to another user, such as user 222, at the user's current location. In this regard, the request may identify the user 222, and not any location information for user 222. In response, the one or more server computing devices 210 may communicate with client computing device 220 in order to determine the current location of client computing device 220, assumed to be the current location of user 222. Alternatively, user 222 may request a vehicle to transport that user to a particular destination location, and the location of client computing device 220 may be sent to the one or more server computing devices 210 as part of the request.

Figure 4:
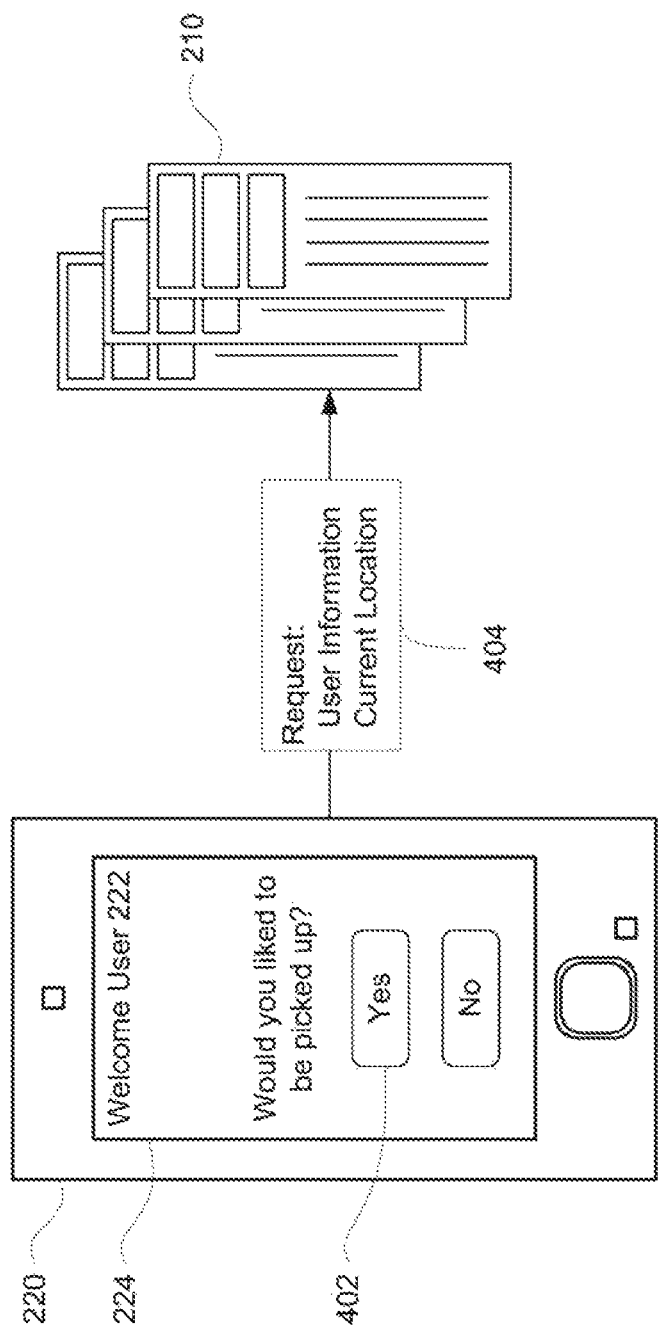
FIG. 4 is an example diagram of a client computing device sending a request to one or more server computing devices in accordance with aspects of the disclosure.

FIG. 4 is an example 400 of a request for a vehicle being made by a user at a client computing device and sent to one or more server computing devices. In this example, client computing device 220 may run an application as described above. Display 224 of client computing device 220 provides a user, such as user 222, with an option 402 to request a vehicle. In response, the client computing device 220 sends a request 404 to the one or more server computing devices 210, for example, via network 240. In this example, the request 404 includes user information which can include or be used to identify the user's client device and/or credentials for authenticating the user and identifying the user's account information as described above. The request 404 also includes the current location of the client computing device 220. As noted above, depending upon the situation information may be sent automatically as part of the request, or in response to a specific request from the one or more server computing devices 210. Although not shown in the example of FIG. 4, if the user has entered a destination location, this information may also be included in the request.

In response to receiving a request, the one or more server computing devices may select a vehicle to be dispatched based upon the location of the client computing device. In order to do so, the one or more server computing devices 210 may identify vehicles that are available to be dispatched, such as any vehicles of the fleet that are not currently being used to transport a user or item. The one or more server computing devices may then use the routing information of storage system 250 to determine which of the available vehicles is closest to the location of the client computing device. The one or more server computing devices may dispatch the closest available vehicle, or rather, send instructions to the computing device of the closest available vehicle to go to the location of the client computing device. If the user is to be transported to another location, the one or more server computing devices may also identify the particular destination location to the closest available vehicle.

Figure 5:
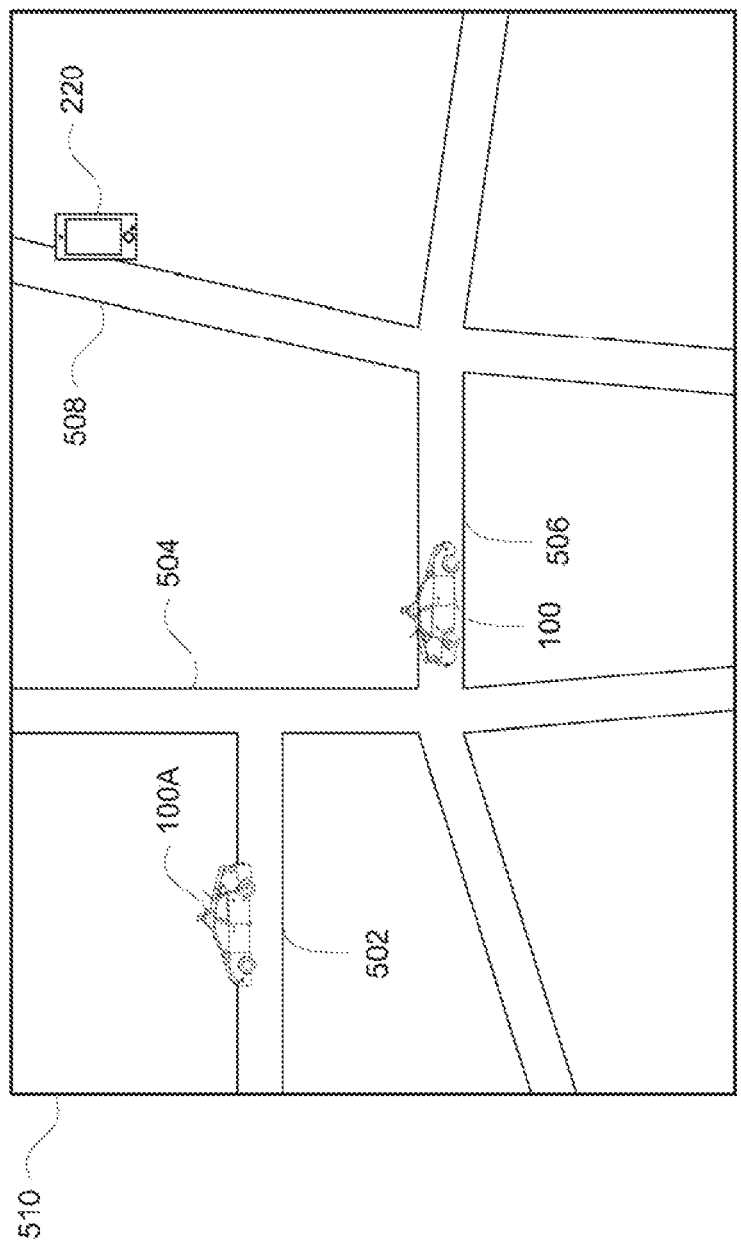
FIG. 5 is an example illustration of a map in accordance with aspects of the disclosure.

FIG. 5 is an example illustration 500 of a map 510. The information depicted in this illustration may be used by the one or more server computing devices to select a closest available vehicle. This map information may be a part of the routing data of storage system 150. The map 510 includes a plurality of roads 502, 504, 506, and 508. In this example, the current locations of vehicles 100 and 100A, as reported to the one or more server computing devices by these vehicles, are displayed. In this example, both vehicles are currently available, while other vehicles in the fleet, not shown, may not be available. In addition, client computing device 220 is depicted at its relative location on the map 510. In this example, vehicle 100 only has to travel a short distance along road 506 and 508, while vehicle 100A must turn around before traveling along roads 502, 504, 506, and 508 and before reaching the location of the client computing device 220. Using this information, the one or more server computing devices may determine that vehicle 100 would reach the location of client computing device 220 faster than vehicle 100A. Thus, in this example, the one or more server computing devices may identify vehicle 100 as the closest available vehicle.

Once the request has been received, the one or more server computing devices may also generate a unique signal according to a set of rules. For example, the set of rules may correspond to the set of rules discussed above with regard to storage system 250. Thus, one or more computing devices 210 may use that set of rules to generate a unique signal. This unique signal may include a unique string of text or alphanumeric characters or an image such as an icon or photograph. In some examples, the unique signal may include a series of nonsensical letters (e.g. they do not form a word), a sequence of colors, a barcode, etc. In this regard, for any combination of the above, the set of choices would be large enough so that the unique signal would not repeat for a given user or trip location such that it would be difficult to impossible to understand the trip patterns for a particular user (e.g. 59007, FLADSOR or the blue boat icon). The unique signals may also be generated using a random number generator. Again, as noted above, the unique signal may also be generated as part of an initial set up of the application.

The unique signal may also be sent to the user's client computing device as part of a confirmation that a vehicle has been dispatched to that user. For example, the one or more server computing devices may send the unique signal to the client computing device of the user when the vehicle is dispatched or when the vehicle is within some threshold distance (or time) to the user. If the request originated by another user, the one or more server computing devices can optionally not send the unique signal to the another user in order to further protect the privacy of the user to which the vehicle was dispatched.

Figure 6:
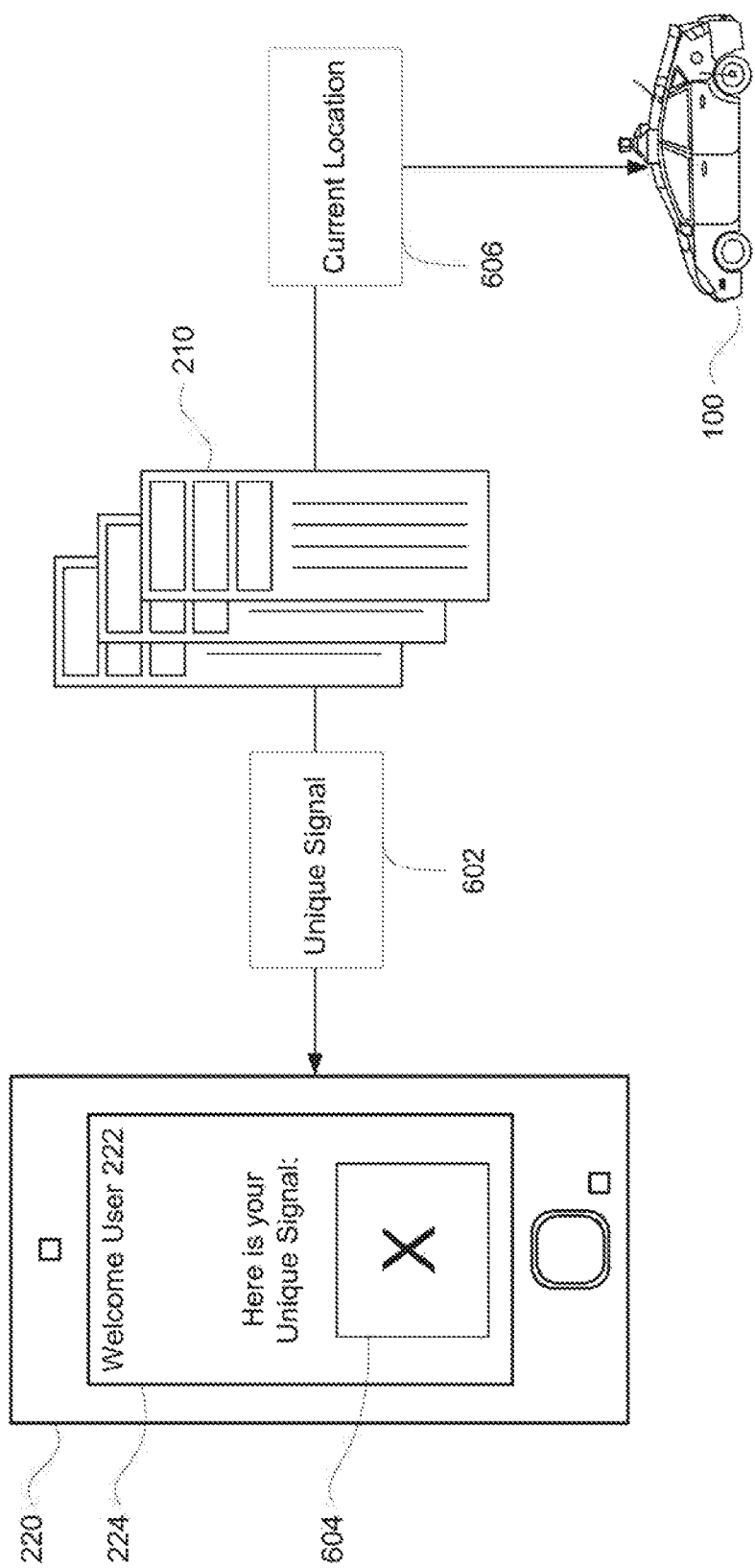
FIG. 6 is an example diagram of one or more server computing devices sending messages to a client computing device and a vehicle in accordance with aspects of the disclosure.

FIG. 6 is an example diagram 600 of one or more server computing devices dispatching a vehicle and sending a unique signal to a client computing device. In this example, the one or more computing devices send a message 602 to the client computing device 220 identifying the unique signal. As noted above, in some examples, message 602 may not necessarily be sent to the client computing device that requested the vehicle, but rather to the client computing device to which the vehicle was dispatched. As discussed in more detail below, the client computing device 220 then displays the unique signal 604 on the display 224 of the client computing device. In addition, the server computing device sends a dispatch message 606 to the closest available vehicle, selected as vehicle 100 in the example of FIG. 5. Returning to FIG. 6, the dispatch message includes the current location of the client computing device 220, for example, the location received in the example of FIG. 4.

Once the vehicle is dispatched, the vehicle's computing device may control the vehicle in order to reach the location of the user provided by the one or more server computing devices. The vehicle's computing device may communicate with the vehicle's navigation system in order to identify a route to the location of the user. The one or more server computing devices may also send updated location information should the location of the client computing device change before the vehicle has reached the location.

Figure 7:
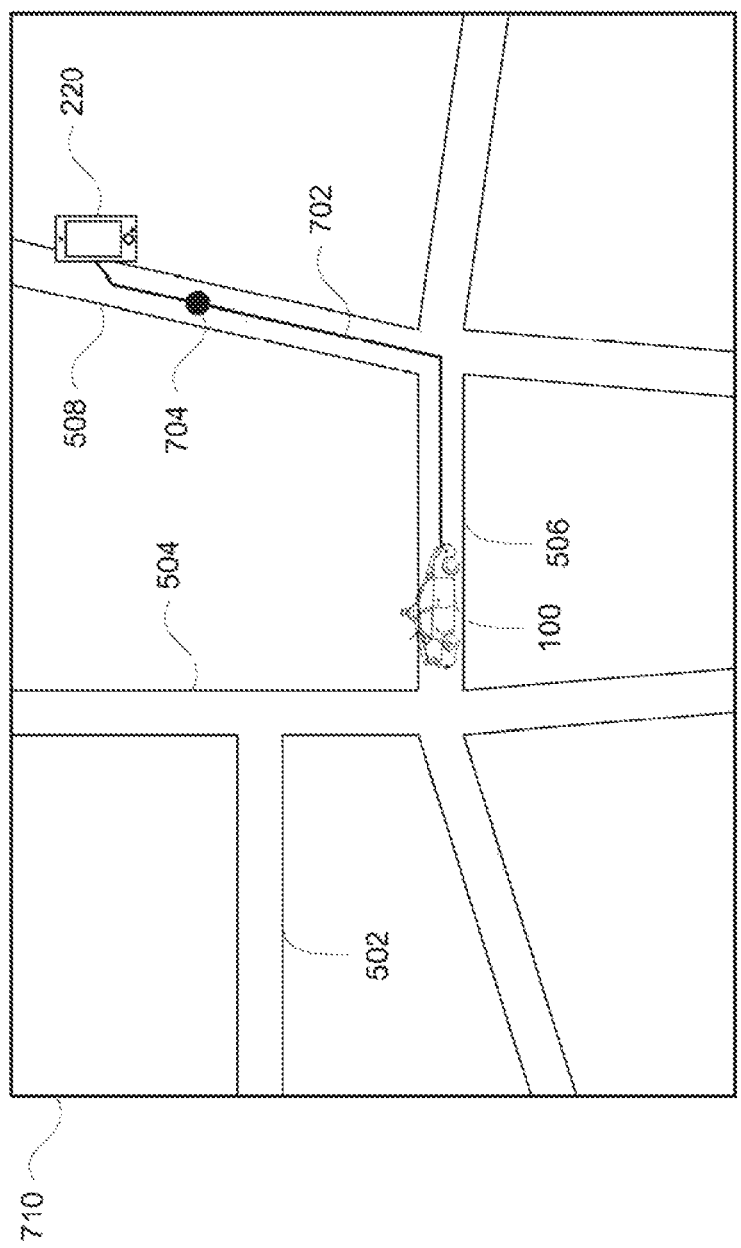
FIG. 7 is an example illustration of a map in accordance with aspects of the disclosure.

FIG. 7 is an example illustration 700 of a map 710. Roads 502, 504, and 506 correspond to such roads of map 510. In this example, the computing device 110 of vehicle 100, now a dispatched vehicle, has used navigation system 166 to plan a route 702 to the current location of the client computing device 220. The computing device 110 may also maneuver the vehicle using the various other systems of the vehicle in order to reach the current location of the client computing device 220. Here, "current location of the client computing device 220" may refer to the location received as a part of message 404 of FIG. 4 or rather a periodically updated value received by the one or more server computing devices and sent to the dispatched vehicle.

As the computing device controls and guides the vehicle to the location of the user, the computing device may continuously estimate its distance from the user in order to determine when the vehicle has reached a threshold distance to the user. This threshold distance may be determined, for example, as a duration in time (e.g., there are 2 minutes or more or less left along the route to reach the location of the user). Alternatively, the distance threshold may be a physical distance such as 50 meters, 0.2 miles, 2 city blocks, or more or less, directly between the vehicle and the user (e.g., a straight line) or along the route until the vehicle reaches the location of the user or a distance. Returning to the example of FIG. 7, the computing device 110 may also identify location point 704, or the point at which the vehicle will be at the threshold distance or time from the current location of the client computing device 220.

Once the vehicle's computing device determines that the vehicle has reached the threshold distance or time, the vehicle may display the unique signal. For example, as discussed above, the unique signal may be displayed in an external electronic display of the vehicle. In order to further protect the user's privacy, if there are multiple external displays of the vehicle, the unique signal may be displayed only on those displays that are likely to be visible for example using a line-of-sight to the location of the user's client computing device. Alternatively, to further protect the privacy of the user, once the vehicle reaches the threshold distance or time, the vehicle's computing device may request the unique signal from the one or more server computing devices. In response, the one or more server computing devices may provide the unique signal to the vehicle, and the vehicle, in turn, may display the unique signal.

Figure 8:
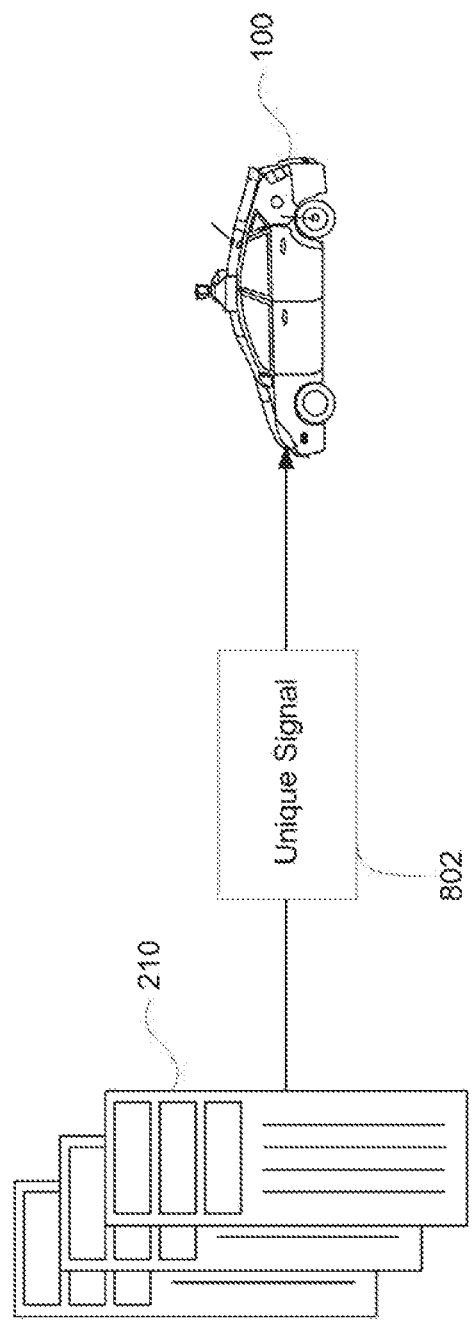
FIG. 8 is an example diagram of one or more server computing devices sending a message to a vehicle in accordance with aspects of the disclosure.

When the vehicle reaches the location point 702, the computer 110 may display a unique signal on a display such as an external electronic display 154, if a unique signal has been received from the one or more server computing devices. Alternatively, when the vehicle reaches location point 702, the vehicle send a notification of the same to the one or more server computing devices 210 and receive a unique signal in response. The received unique signal may then be displayed on the electronic display. FIG. 8 is an example diagram 800 of a vehicle receiving a unique signal sent by one or more server computing devices. In this example, the one or more server computing devices 210 may send a message 802 including the unique signal to the vehicle 100.

Figure 9:
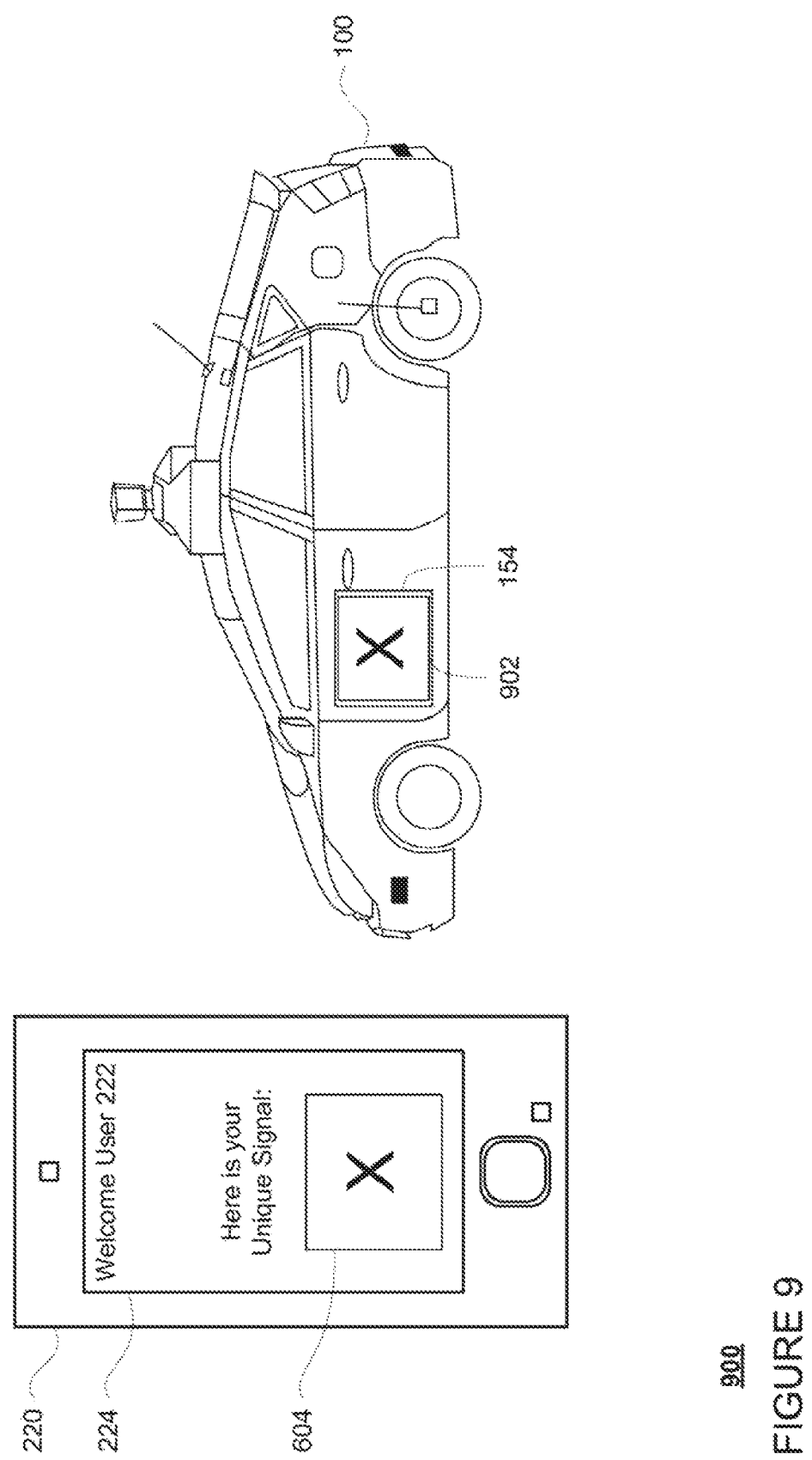
FIG. 9 is an example diagram of a client computing device and a vehicle in accordance with aspects of the disclosure.

FIG. 9 is an example diagram 900 of a client computing device and a computing device of a vehicle displaying a unique signal at the same, or nearly the same time. A comparison of the unique signal 604 of display 224 to unique signal 902 of external electronic display 154 may allow a user to recognize that vehicle 100 was dispatched for that user. In other words, if they are the same, the user can easily identify the vehicle, and if not, the user may continue to look for the vehicle that was dispatched for that user.

Figure 10:
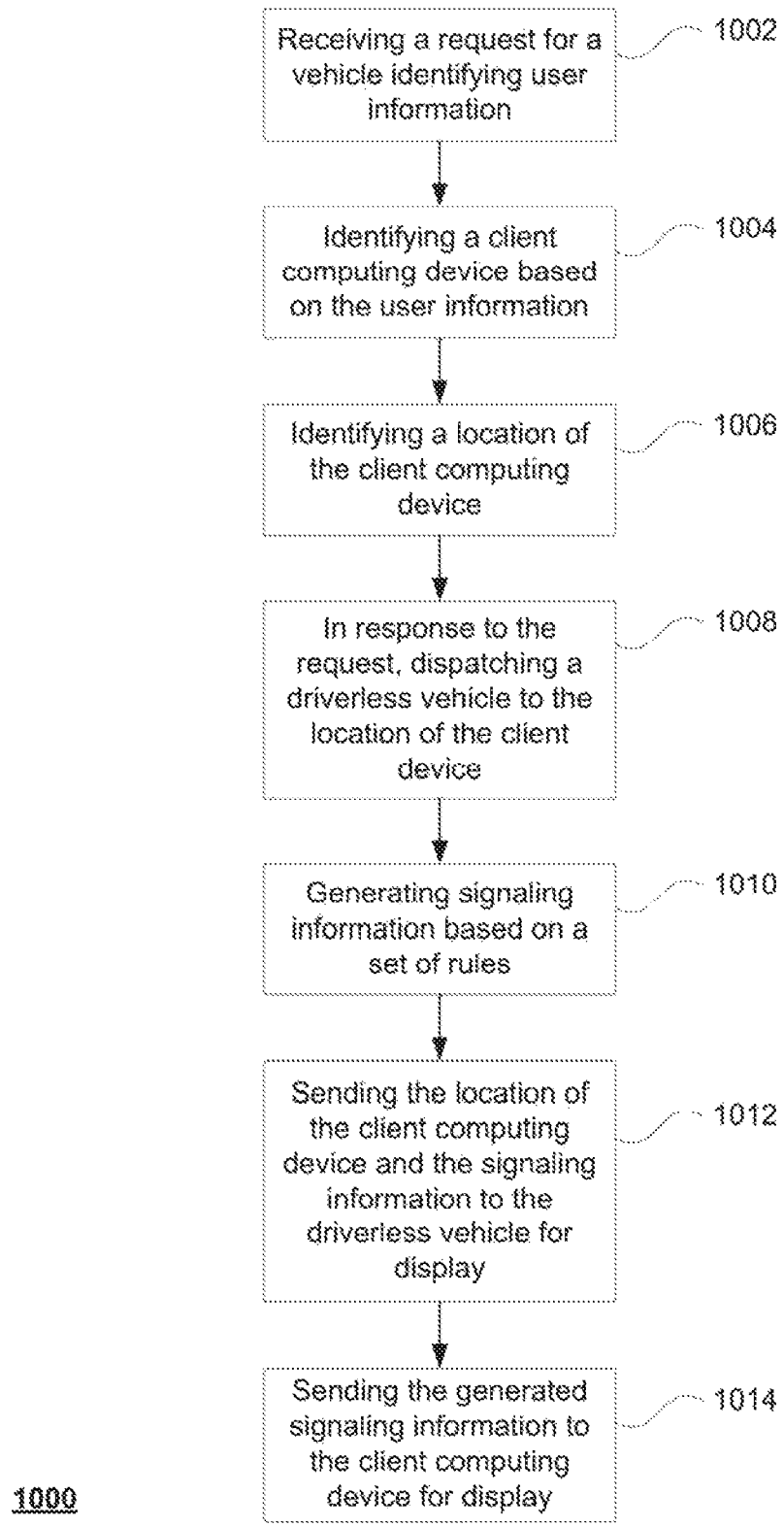
FIG. 10 is a flow diagram in accordance with aspects of the disclosure.

Flow diagram 1000 of FIG. 10 is an example of some of the aspects described above which may be performed by one or more computing devices, such as server computing devices 210. Flow diagram 1000 is merely one implementation of the features described above, and thus, various other combinations and operations of the features described may also be used. In the example of FIG. 10, a request for a vehicle identifying user information is received at block 1002. This user information may include user credentials or any information that the one or more server computing devices may use to identify a particular user or user's client device. At block 1004, a client computing device based on the user information. This client computing device may be identified for example because it is included in the user information or by reference to user account information identified by the user information. At block 1006, a location of the client computing device is identified. Again, this location may be identified as part of the user information or may be identified by sending a request to the client computing device for its current location.

In response to the request, a driverless vehicle is dispatched to the location of the client device at block 1008. In addition, signaling information is generated based on a set of rules at block 1010. For example, this set of rules may include the rules discussed above with regard to the storage system 250. The location of the client computing device and the signaling information is sent to the driverless vehicle for display, for example, to a user at block 1012. The signaling information is also sent to the client computing device for display, for example to the user at block 1014.

Accordingly, rather than simply getting a notification that the user's vehicle is "here," the user also receives also information which may be used to identify the vehicle to the user without compromising the user's privacy. Thus, as the vehicle approaches the user, the user is able to quickly and easily identify that the vehicle has been dispatched to the user (or rather, the user's client computing device) by comparing the unique signal received on the client computing device (or assigned as part of the initial set up for the application) to the unique signal displayed on the electronic display of the vehicle. In addition, the likelihood of confusion of other users or persons is very small given the fact that the displayed unique signal is unique to the user.

In some instances, the unique signal may also be used to authenticate the user to the vehicle, or rather so that the vehicle can confirm that it has reached the correct user. In such an example, the unique signal may be an authentication token that will expire a short amount of time after the vehicle is expected to reach the location of the user. In another example, the authentication token can expire once the user (or user's client computing device) is located within the vehicle, as confirmed by communication between the client computing device and the vehicle's computing device, or when the user interacts with an in-vehicle interface such as the internal electronic display 152. The functionality of such a token may be determined by the one or more server computing devices when generating the unique signal in response to a request to dispatch a vehicle as described above. In this regard, a further rule of the set of rules of storage system 250 may require that the unique signal expire a fixed period of time after a dispatched vehicle is expected to reach the location of the user. Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   receiving, by one or more processors of one or more server computing devices, a request for a vehicle, the request identifying a location;
   in response to the receiving the request, assigning, by the one or more processors, a vehicle to a trip for a passenger of the vehicle, and generating, by the one or more processors, a signal that identifies a color associated with the trip;
   dispatching, by the one or more processors, the assigned vehicle to the location for the trip;
   sending, by the one or more processors to a client computing device of a user, the signal as part of a confirmation that the assigned vehicle has been dispatched to the user; and
   sending, by the one or more processors the signal to the assigned vehicle, in order to enable the assigned vehicle to display the color to identify the assigned vehicle to the passenger while protecting the user's privacy.

2. The method of claim 1, wherein the signal further includes a pattern of colors, and the sending the signal further enables the assigned vehicle to display the pattern of colors.

3. The method of claim 1, wherein the signal is not repeated for a future trip that follows the trip.

4. The method of claim 1, wherein the sending the signal further includes sending instructions to display the color based on proximity of the assigned vehicle to the location.

5. The method of claim 1, wherein the passenger is the user.

6. The method of claim 1, wherein the passenger is not the user.

7. The method of claim 1, further comprising:
   in response to the sending the signal to the client computing device of the user, receiving user input confirming the signal prior to sending the signal to the assigned vehicle.

8. The method of claim 1, wherein the generating the signal is based on a set of privacy rules.

9. The method of claim 8, wherein the privacy rules include preventing the signal from identifying the user directly or indirectly.

10. The method of claim 8, wherein the privacy rules include preventing the signal from identifying a prior or current location of the user directly or indirectly.

11. The method of claim 8, wherein the privacy rules include preventing the signal from identifying a destination location for the trip.

12. A method comprising:
   sending, by one or more processors of a user's client computing device, a request for a vehicle for a trip, the request identifying a location;
   in response to the sending the request, receiving, by the one or more processors, a signal that identifies a color associated with the trip as part of a confirmation that that a vehicle has been assigned to the trip; and
   displaying, by the one or more processors, the color identified by the signal to indicate to the user the color that will be displayed by the assigned vehicle to identify the assigned vehicle to a passenger of the vehicle while protecting the user's privacy.

13. The method of claim 12, wherein the signal further includes a pattern of colors displayed on a display.

14. The method of claim 12, wherein the signal is not repeated for a future trip that follows the trip.

15. The method of claim 12, wherein in response to the displaying the color, receiving user input confirming receipt of the signal.

16. A method comprising:
 receiving, by one or more processors of a vehicle, dispatch instructions identifying a location;
 generating, by the one or more processors, a signal that identifies a color associated with a trip for a passenger of the vehicle;
 maneuvering, by the one or more processors, the vehicle towards the location in order to pick up a passenger;
 receiving, by the one or more processors, the signal; and
 prior to the vehicle reaching the location, displaying, by the one or more processors, the color identified by the signal on a display of the vehicle to identify the vehicle to the passenger while protecting a user's privacy.

17. The method of claim 16, wherein the signal further includes a pattern of colors displayed on the display.

18. The method of claim 16, further comprising:
 receiving instructions to display the color based on proximity of the vehicle to the location.

19. The method of claim 16, wherein the color is displayed only on displays of the vehicle that are likely to be visible to the passenger.

20. The method of claim 16, further comprising:
 sending a request for the signal based on a proximity of the vehicle to the location, wherein the signal is received in response to the request.

* * * * *